Dec. 21, 1965  A. CIVELLI  3,224,296
DEVICE FOR RADIALLY SUPPORTING A ROTARY SHAFT
IN A STATIONARY PART
Filed March 4, 1963  5 Sheets-Sheet 1

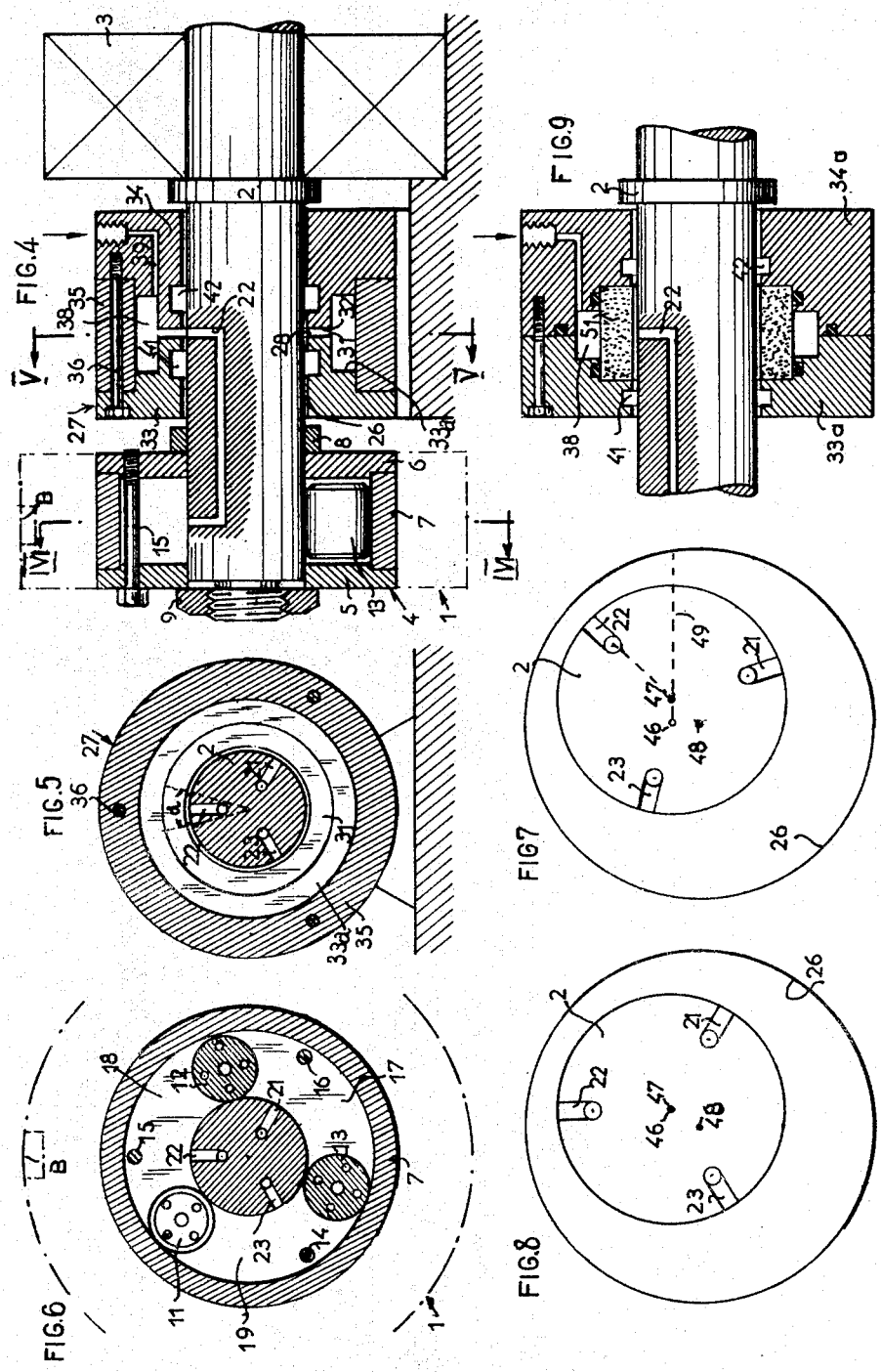

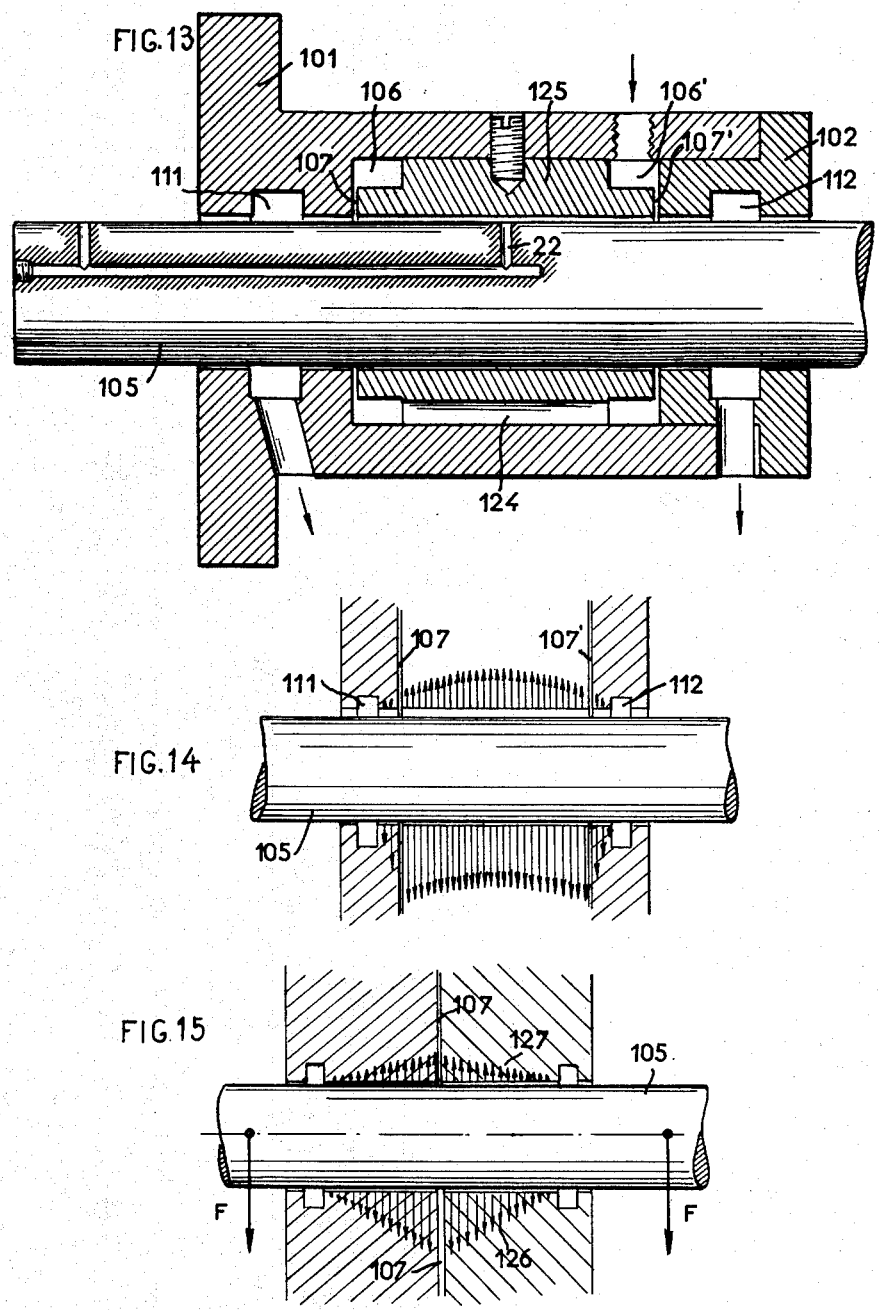

United States Patent Office 3,224,296
Patented Dec. 21, 1965

3,224,296
DEVICE FOR RADIALLY SUPPORTING A ROTARY SHAFT IN A STATIONARY PART
Adrien Civelli, Boulogne-sur-Seine, France, assignor to Landis-Gendron S.A., Villeurbanne, Rhone, France, a company of France
Filed Mar. 4, 1963, Ser. No. 262,553
Claims priority, application France, Mar. 6, 1962, 890,115; Feb. 27, 1963, 926,140
6 Claims. (Cl. 74—573)

The present invention concerns a device for radially supporting without mechanical friction a rotary shaft in a stationary part integral with a frame.

Devices of this type may be used as bearings, or as elements for detecting the position of a rotary shaft with respect to a stationary element, said detecting element serving, for instance, to pilot an automatic dynamic unbalance compensation device. In the most advantageous embodiments of the invention the device serves both as a bearing and unbalance detector, which permits to realize automatic balancing bearings without mechanical friction.

The device according to the invention has a stationary element comprising a smooth bore as well as at least one annular chamber to which the fluid under pressure is fed and which communicates with said bore, and it also has an annular passage provided in said stationary part for the flow of said fluid under pressure underneath said chamber around said shaft and its following evacuation at at least one of the ends of said bore, said passage also being provided with at least one restricted annular section surrounding said shaft.

According to a preferred embodiment of the invention the above mentioned restricted annular passage is constituted by a narrow interval having the shape of a thin disc, limited by two essentially plane parallel faces of the stationary part which are disposed transversely with respect to the shaft, said interval opening towards the center into the bore, and towards the periphery into an annular chamber communicating with a source for fluid under pressure.

The fluid under pressure transmitted to the aforementioned annular chamber passes from the outer diameter to the inner diameter of the narrow interval having the shape of a thin disc. The fluid output thus is essentially radial and depends on the whole of the circumference of the fluid disc on the fluid leaks around the shaft, i.e., on the clearance existing between the shaft and the inner circle of the fluid washer at the point considered.

Accordingly, when the shaft is off-center in the bore there occur in the restricted passage load losses which vary in accordance with the considered radial direction, i.e., the radial pressures brought to bear by the fluid on the shaft on that side of the shaft with reduced clearance are higher than on the diametrically opposed side where the clearance is more considerable.

The differential pressures brought to bear on the shaft tend to re-center the same in its bore, and owing to this feature a bearing without mechanical friction is obtained which opposes a great rigidity to static and rotary loads.

These same differential pressures can be measured at the shaft, e.g., by means of three channels spaced at 120° provided in the shaft and opening into the variable pressure zone of the fluid, so as to pilot an automatic unbalance compensation device. In this way, an automatic balancing bearing is realized.

Several embodiments of the invention will now be described with reference to the accompanying drawings by way of illustration, wherein:

FIG. 4 shows a longitudinal section through another embodiment of the invention wherein the device is used as a detector for an automatic dynamic unbalance compensating device;

FIGS. 5 and 6 show radial sections taken, respectively, on the lines V—V and VI—VI in FIG. 4.

FIGS. 7 and 8 show, in radial section, the operation of the unbalance detector;

FIG. 9 shows a partial longitudinal section of a modification of the device shown in FIG. 4;

FIG. 13 is another modification of the device which can be used as a bearing and unbalance detector;

FIG. 14 is a graphic showing the pressure distribution in the device shown in FIG. 13;

FIG. 15 is a graphic showing the pressure distribution in a device according to the invention wherein the thickness of the slot through which the fluid flows is not constant;

Figure 1:
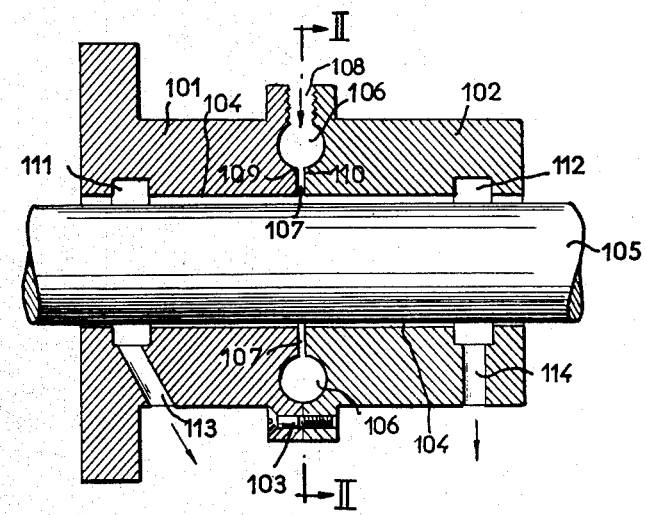
FIG. 1 is a longitudinal section of an embodiment of the invention wherein the device is used to serve as a bearing without mechanical friction for a shaft.

In the simple embodiment shown in FIG. 1 the stationary part is composed of two members 101–102 interconnected by means of a screw 103, for example, and wherein is provided a smooth bore 104 which receives shaft 105. The bore comprises an annular recess 107 to which the fluid under pressure is supplied and which surrounds shaft 105. This recess 107 forms a restricted annular fluid passage which is constituted by the narrow space defined by the two opposed parallel plane faces 109 and 110 of stationary parts 101–102.

The restricted space 107 opens toward the center into the bore in front of shaft 105 and, towards the periphery, into an annular feeding chamber connected to a source which supplies fluid under pressure through an orifice 108.

It will be noted that the width of the restricted space 107, i.e., the thickness of the fluid disc, depends on the clearance existing between members 101, 102, and that this clearance can be adjusted at the desired value by adjustment of these members.

The oil under pressure admitted through orifice 108 penetrates into feeding chamber 106 whence it flows radially into the restricted passage 107 where it is subjected to a loss of load and is evacuated through the clearance existing between bore 104 and shaft 105 towards two return grooves 111 and 112 provided in members 101 and 102. These two return grooves communicate with a connection to atmospheric pressure (not shown) by means of conduits 113 and 114.

Figure 2:
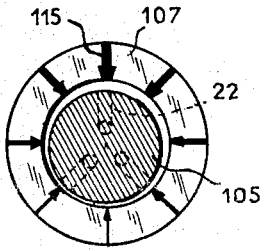
FIG. 2 shows a radial section taken on line II—II in FIG. 1.
Figure 3:
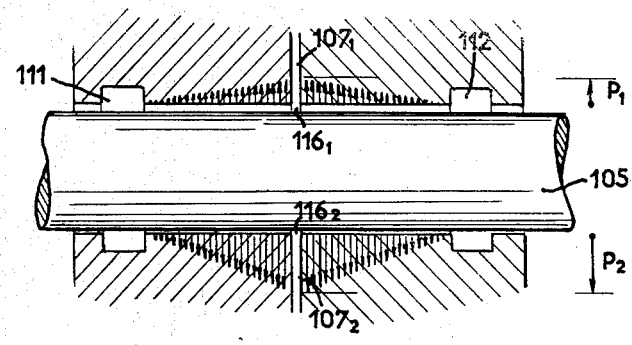
FIG. 3 is a graphic showing the pressure distribution in the device shown in FIG. 1.

When shaft 105 if off-center, e.g., downwardly, the potential output in the clearance existing between bore 104 and shaft 105 is—in a vertical radial plane—smaller downwardly than upwardly. In FIG. 2 where this radial section is shown, the more or less considerable radial oil outputs in the fluid disc have been indicated by more or less thick arrows 115. Accordingly, the load losses in the restricted passage are smaller towards the lower end, where the output is low than towards the upper end where the output is more considerable, i.e., a pressure gradient builds up which tends to lift the shaft and, consequently, to recenter the same. FIG. 3 shows the pressure distribution on the two diametrically opposed generatrices, at the high and low end of the shaft.

If $P_o$ is the supply pressure of the oil, and if P and p, respectively, are the load losses on the upper and lower radii $107_1$–$107_2$ of the slot, the pressures prevailing at outputs $116_1$–$116_2$ of the slot will be, respectively:

$$P_1 = P_0 - P$$

and $$P_2 = P_0 - p$$

where:

$$P_2 P_1$$

Since grooves 111 and 112 are at atmospheric pressure (or at least at an equivalent pressure), pressure will decrease regularly from points $116_1$–$116_2$ until it reaches these slots, and the surface of the triangle of force of the lower generatrix is greater than that of the triangle of force of the upper generatrix.

Thus it will be noted that as soon as the shaft is subjected to stresses tending to off-center it—whether it be immobile or rotating—it is immediately brought back towards the center of the bore, which actually constitutes a bearing without mechanical friction.

Since the device according to the invention creates a continuous load loss which is variable around the shaft in accordance with its off-centered position, it can be utilized as a source for a pressure collector piloting an automatic balancing system. All that is required to achieve this purpose is to bore into the shaft a series of radial channels, e.g. 3 channels spaced at 120° such as the ones indicated in dashes at 22 in FIG. 2 and which terminate opposite of slot 107.

An automatic balancing system, or dynamic unbalance compensating device is shown in FIGS. 4, 5 and 6, and shall be described below.

The part the unbalance of which it is desired to compensate is represented diagrammatically by an annular cylindrical part 1 (FIGS. 4 and 5) integral with a shaft 2 rotatably mounted in conventional bearing 3. The axis of the rotating shaft is horizontal and the annular part is mounted on one end of said shaft by means of a kind of hub which constitutes the operative portion of the unbalance compensation device which is designed, as a whole, by 4. This device has two equal discs 5, 6 between which a ring 7 is held, this assembly of three parts being gripped between a nut 9 screwed on the threaded end of said shaft and a ring 8 shrunk onto shaft 2 and integral with the same.

The annular space bounded by the cylindrical end surface of shaft 2, the inner cylindrical surface of ring 7 and the two opposite faces of the two discs 5 and 6, respectively, form an annular chamber of rectangular section wherein are disposed three compensation bodies constituted by three cylindrical rollers 11, 12, 13. These rollers can move freely in the annular chamber and their diameter is very slightly smaller, i.e. $2/100$ of a mm., than the half-difference in diameter of the shaft and ring 7; similarly, the length of each roller is also very slightly smaller, i.e. $2/100$ of a mm., than the distance between the two opposite faces of the two discs 5 and 6.

In the annular chamber the three rollers 11, 12, 13 bound three variable spaces or compensation chambers 17, 18, 19, respectively in communication with three bent passages 21, 22, 23 formed inside of shaft 2 and leading on to equidistant points on the cyindrical surface of the latter. Stops 14, 15, 16 disposed against the inside cylindrical face of ring 7 limit in a positive manner the displacements of the compensation rollers to an arc of approximately 120°, in order that the same compensation chamber cannot be fed with fluid under pressure by two radial passages simultaneously.

A stationary part 27 (cf. FIG. 5) surrounds the shaft with a slight clearance. The above-mentioned bent passages lead on to a bore 26 of part 27 at right angles with a continuous annular zone constituted by the narrow space 28 bound by two parallel annular plane faces 31, 32 transversely disposed with respect to the shaft and belonging, respectively, to two parts 33, 34 assembled against a washer 35 through screws 36 and the assembly of which constitutes stationary part 27.

The portion of the narrow space 28 comprised between two radial planes forming a very small angle $a$ (FIG. 5) operates in the manner of an elementary radial restriction.

Space 28 leads on to an annular chamber 38 which communicates via a passage 39 with a source of liquid under constant pressure (not shown), e.g. oil.

Two annular grooves 41, 42 provided in the bore of parts 33, 34, respectively on either of the narrow space 28 collect the oil leaking through the restricted passages along the shaft and return the same to the tank.

The operation of the device is as follows:

If shaft 2 is subjected to a co-rotating radial stress such as for instance the stress build up by an unbalance B, its axis 47 rotates about a rotating axis 46 (FIG. 7) off-center or not, with respect to axis 48 of bore 26 which is not to be mistaken for axis 47 of said shaft.

In the course of one complete revolution of the shaft any point connected to the periphery of the same and located in the neighbourhood of the radial half-plane 49 (FIG. 7) which connects the rotating axis 46 to axis 47 of the shaft is, generally, closer to bore 26 of the stationary part than a point located in the neighbourhood of the opposite radial half-plane.

The pressure prevailing in passage 22 and in the corresponding compartment 18 between the two balancing rollers 11, 12 increases whereas the pressure prevailing in passages 21, 23 and the corresponding compartments 19 and 17 decreases since the section of the fluid leak between shaft 2 and the bores of parts 33, 34 towards the annular groves 41, 42 decreases in the neighbourhood of passage 22 while progressively increasing in the neighbourhood of the two other passages 21, 23. Rollers 11 and 12 come close to roller 13, i.e. they move in the direction which tends to produce an unbalance compensation.

As long as the unbalance subsists the roller will be moved in the direction which tends to compensate said unbalance.

As soon as the unbalance has been compensated, the axis of rotation 46 and axis 47 of the shaft will merge (FIG. 8) but this does not mean that they are on the axis 48 of bore 26 of the stationary part, which besides, is not critical. Indeed, when the unbalance has been compensated the balancing rollers are immobile with respect to the annular part which encloses them, and the value of the pressure prevailing in each of compartments 17, 18, 19 is at any time equal to the value of the pressure prevailing in the annular clearance between the shaft and bore 26 of the stationary part 27 at the point where the corresponding bent passage 21, 22 or 23 leads on to the periphery of the shaft. If the axis of rotation 46 of the shaft is off-center with respect to axis 48 of bore 26 this pressure varies cyclically, but its mean value in the course of each revolution is constant for a given off-center position (given as to its direction as well as to its dimensions) of axes 46 and 48. When the rotating movement of the shaft describes a perfect circle the mean pressure values prevailing in the three compartments are identical and the three rollers are not subjected to any stress tending to modify their positions which are the positions for which the unbalance is perfectly compensated. Thus this compensation is maintained whichever the off-center position of the shaft with respect to the stationary part 27 referred to.

In the modified embodiment shown in FIG. 9 the narrow space has been replaced by an annular part 51 of porous material, such as sintered material, gripped between the two parts 33a and 34a. This device operates in the same manner as the device shown in FIGS. 4 to 6.

In the above-described embodiment the system with a continuous load loss through an annular slot or in a porous ring does not act as a detector of off-center shifts, since the distance between the slot and the grooves which evacuate the oil is small contrarily to the first embodiment (cf. FIG. 3), the radial support of the shaft being ensured by an outside bearing 3 of conventional type.

Figure 10:
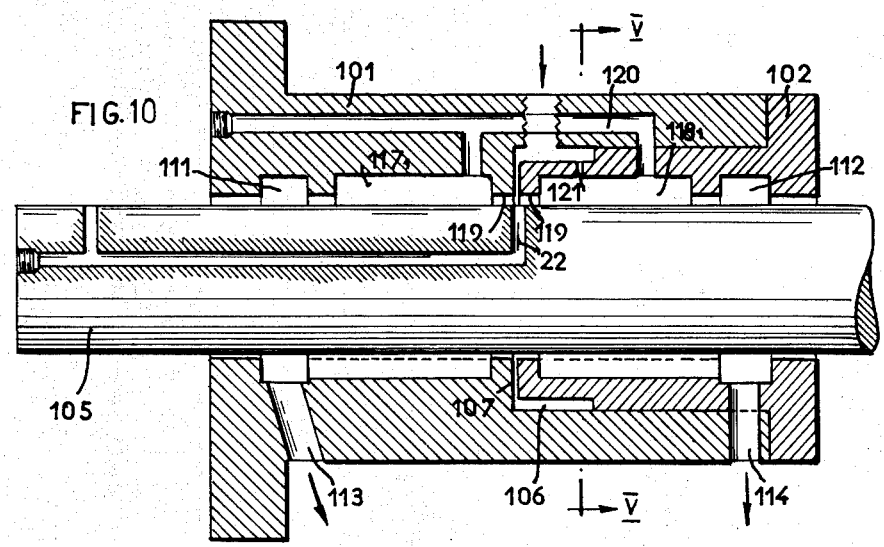
FIGS. 10, 11 and 12 show, respectively, a longitudinal section, a radial section and a developed partial view of another embodiment of the invention.
Figure 12:
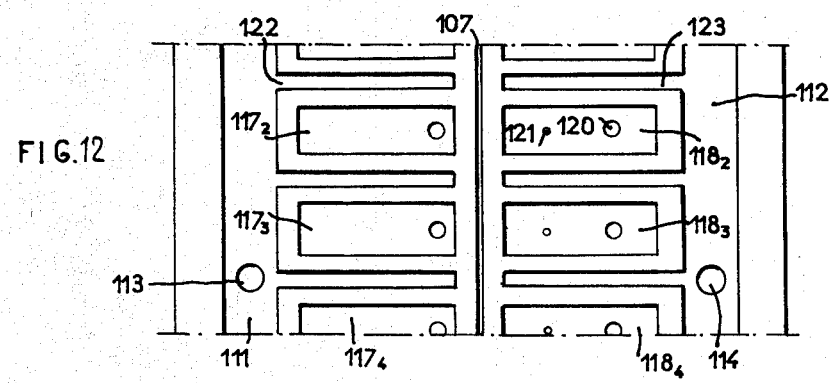
Figure 11:
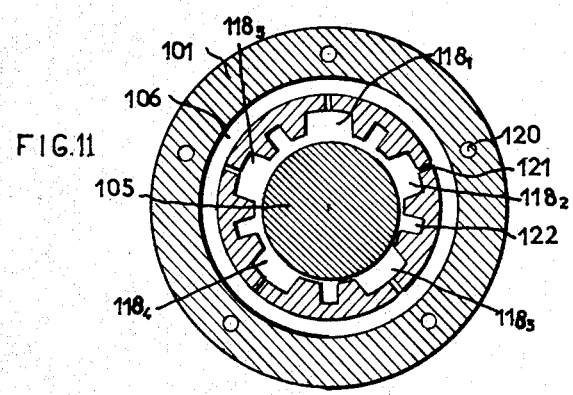

In the modification shown in FIGS. 10, 11 and 12, the slot device also serves only to detect off-center shifts to compensate any unbalance, but the radial support of the shaft is ensured by a bearing of the so-called "fluid" type combined with the slot device.

As in the first embodiment the stationary part is constituted by two members 101–102, but they are fitted into each other letting subsist between them annular slot 107 as well as the annular feeding chamber 106. The two stationary members are also provided with two grooves for the return of the oil, as in the case of the embodiment shown in FIG. 1, but in addition they are provided with a plurality of recesses 117–118, which may be five in number, forming five pressure zones divided into half-zones by the continuous area 119 into which opens slot 107. The half-zones or recesses 117–118 are made to communicate in pairs by means of by-pass channels 120 bringing them at level pressure and which are fed through nozzles 121 opening, on the one hand, into anular chamber 106 and, on the other hand, into recesses 118.

Also bored between recesses 117 and 118 in members 101–102 are longitudinal channels 122–123 which open into the return grooves 111–112 and collect towards the latter the oil leaks between the adjacent recesses 117–118 (cf. the developed partial view of the inside of the bearing in FIG. 12).

In the same manner as in the embodiment shown in FIG. 4 the shaft is provided with three radial channels 22 at 120° one end of which opens into the chambers of the unbalance compensation device with roller (not shown in FIG. 10). The operation of the unbalance compensation device is the same as that described with respect to FIGS. 4, 5 and 6.

The operation of the device when used as a bearing is similar to that of a bearing of the "fluid" type, i.e. if a static force tends to off-center the shaft 105 downwardly (FIG. 11) the pressure which builds up in the lower recesses $117_3$–$117_4$ and $118_3$–$118_4$ is higher than the pressure which builds up in the upper recesses $117_2$–$118_2$, as a result of the difference of clearances over all of the periphery of the shaft, and the shaft shows a tendency to re-center under the action of the differential pressures created by the off-center shift.

In the modification shown in FIG. 13 the device comprises two slots having the shape of a thin disc 107 and 107' fed with fluid under pressure by annular chambers 106 and 106' connected by a pressure balancing conduit 124. In this case, the stationary part can be constituted by three members 101–102–125 assembled in such a way that they define between them the two narrow slots 107 and 107'.

This embodiment is more advantageous than the embodiment shown in FIGS. 1 and 3 in that it permits the building up of a more uniform pressure field (FIG. 14) and accordingly permits a higher load on the bearing. In FIG. 14 it can be seen that the pressure is not strictly uniform throughout one section between slots 107 and 107'. The pressure is slightly higher in the center, on the side with the maximum clearance between the shaft and the bearing (upper generatrix in the figure), and contrarily it is lower at the center on the side with the minimum clearance (lower generatrix). This difference results from the circular fluid output caused by the pressure field.

It is obvious that the channels 22 which serve as pressure detectors can, as in the preceding cases, transmit the pressure field to an unbalance compensation device (not shown).

According to another embodiment the slot (or the slots) in the shape of a thin disc can be given a variable thickness over their periphery, surfaces 109 and 110 (FIG. 1) which determine this disc being, for instance, not perfectly parallel.

It is only for this case that the pressure graphic has been shown in FIG. 15, the whole of the assembly being in all other respects identical with the one shown in FIG. 1. It will be seen that slot 107 is at its lower part larger than at its upper part, so that shaft 105 can be kept centered in its bearing even if there exists a permanent static load F—F on the shaft. The shaft being centered, as shown in FIG. 15, the surface difference between the lower pressure triangle 126 and the upper pressure triangle 127 represents a load on the shaft which is exactly opposed to the static load F—F and keeps the shaft centered.

Such a slot with variable thickness (or 2 slots with variable thickness as in the case of FIG. 13) which causes asymmetry in the pressure, but this does not eliminate the operation of a pressure detector piloting an unbalance compensation device, if it should be deemed desirable to adapt one. Indeed each of the detector channels 22 passes successively in front of all the parts of the slot and the pressure indicated by these detectors depends on nothing but the rotary movement of the shaft.

Figure 16:
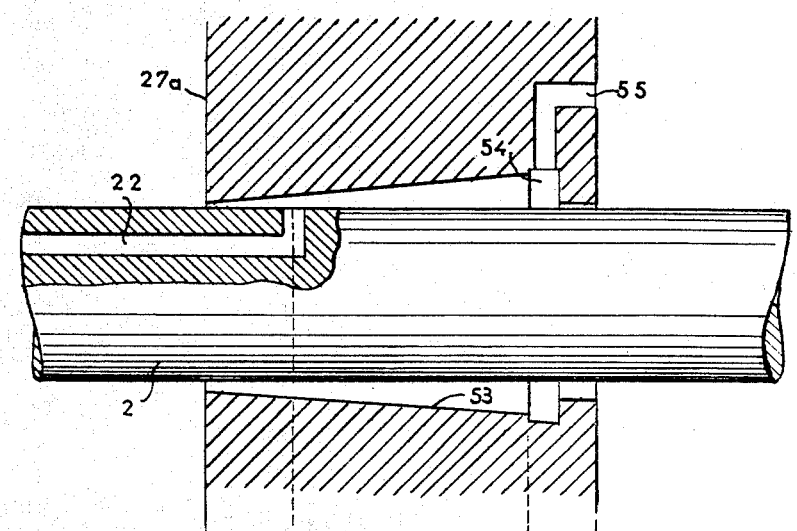
FIGS. 16 and 17 show still another embodiment of the invention, as well as a corresponding pressure graphic.

In FIG. 16 there is shown another embodiment of the invention wherein the continuous load loss around the shaft is produced by a restricted passage subsisting between a conical bore bored in a stationary part 27a and the shaft 2. The difference between the maximum diameter and the minimum diameter of the shaft amounts to several hundredths of a millimeter.

In the neighbourhood of the end of ring 27a where the bore has reached its maximum dimensions the fluid under pressure (preferably oil) is carried to an annular groove 54 by a channel 55 from a source at an essentially constant pressure Po (not shown). The three channels such as 22 bored into the shaft at 120° from each other open into the periphery of said shaft, in the neighbourhood of the point where the conical bore of the ring attains its minimum dimensions.

Figure 17:
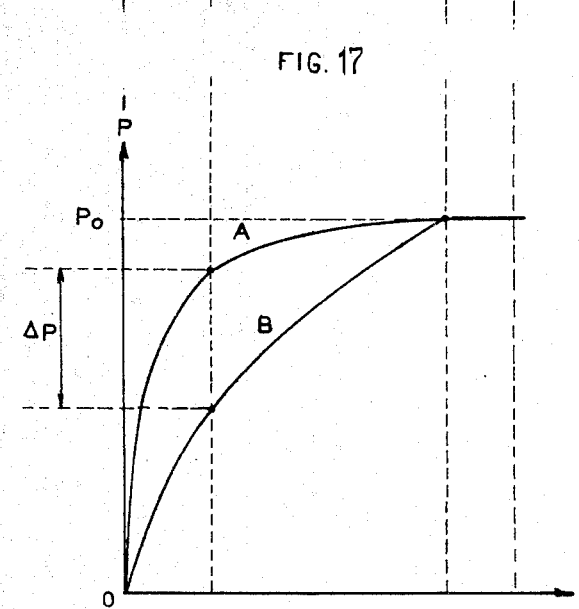

Since the clearance varies linearly along the bore, the load loss suffered by the fluid per unit of length in a narrow area around a diametrical half-plane is not constant but increases in the downstream direction. Furthermore the greater the ratio between the clearance at the upstream end and the clearance at the downstream end the greater is the variation, between two given right section planes, of the load loss per unit of length. Now, in a narrow area defined between two adjacent diametrical half-planes this ratio is so much higher as, in the neighbourhood of these diametrical planes, the shaft is closer to the bore. It results from this, for instance in the case of FIG. 16 where the shaft is off-center towards the top of the figure, that the curves indicating the pressures at a given point of the clearance show the form reproduced in FIG. 17 where curve (A) corresponds to the upper half of FIG. 16 and curve (B) to its lower half. In the right section plane where the channels 22 open into the periphery of the shaft, there is, accordingly, a pressure difference P available, which can have a considerable value, for trying to recenter the shaft in its bore and ensure the displacement of the balancing rollers of the unbalance compensation device.

In a practical construction of the embodiments shown in FIGS. 1 to 15 the clearance between the two faces of the slot amounts to one tenth of a millimeter, save ±15 microns.

The unbalance compensation system shown in FIG. 4 is constituted mainly by three rollers rolling inside of two cylindrical surfaces (an inner and an outer one) the axis of which merges with the axis of the spindle and which are closed laterally by two plane surfaces perpendicular with respect to the rotating axis of the spindle.

If $D1$ = the diameter of the outer cylindrical surface
$D2$ = the diameter of the inner cylindrical surface
$d$ = the diameter of the rollers Then:

$$\frac{D1 - D2}{2} = d + 2 \text{ hundredths of a millimeter}$$

The clearance admitted for these 2 hundredths is ±5 microns.

If $L$ = the interval between the two parallel planes
$l$ = the length of the rollers Then:
$$L = l + 2 \text{ hundredths of a millimeter}$$

These two hundredths must be realised with a ±5 microns precision.

In this embodiment the mass of each roller amounts to 40 grams, their diameter and length being 20 mm. The diameter of the inner cylinder whereon they roll is 110 mm.

In these conditions the unbalance which can be corrected is 170 gr.×cm.

In a modification of this embodiment the diameter and the length of the rollers are 30 mm., the diameter of the inner cylinder whereon they roll is 160 mm. and the maximum balancing capacity is 800 g.×cm.

The fluid used is oil under a constant pressure of 4 to 8 kg. per cm.² with a viscosity of 10 centistokes, the necessary output being 1 liter per minute.

It is well understood that the invention is not limited to the embodiments described and illustrated which have been given by way of example, but numerous modifications may be made to it depending on the applications envisaged, without thereby departing from the scope of the invention.

What is claimed is:

1. In combination with a body mounted on a rotary shaft for rotation about the axis of said shaft and a balancer member coaxial with said shaft, and containing a plurality of balancing elements displaceable in said member and dividing it into arcuate chambers, a mechanical bearing structure axially spaced from said balancer member and supporting the rotary shaft, a detecting member positioned between said balancer member and said bearing structure and including means for detecting any unbalance in said body comprising a cylindrical inner surface surrounding a length portion of said shaft with a clearance space therebetween, an annular chamber in said detecting member, an annular channel extending radially and circumferentially between said annular chamber and said clearance space, a plurality of separate ducts in said shaft for establishing a communication between said clearance space and each of said arcuate chambers, said ducts opening into said clearance space at equi-angularly spaced points, and means for conducting fluid under pressure to said annular chamber to produce pressure differentials in said clearance space proportional to any unbalance of said body, so as to induce a compensatory shift in the relative position of said balancing elements in accordance with said pressure differentials.

2. The combination according to claim 1, in which said channel is defined by two axially spaced and mutually facing annular surfaces of said detecting member.

3. The combination according to claim 1, in which the duct portions opening into said clearance space are in radial alignment with said annular channel.

4. The combination according to claim 2, in which said channel includes a ring of porous material inserted between said two annular surfaces of the detecting member.

5. The combination according to claim 3, in which said cylindrical inner surface of the detecting member is formed with a plurality of circumferentially spaced recesses located between said annular channel and one end of said cylindrical inner surface, and with a plurality of circumferentially spaced recesses located between said annular channel, and the other end of said cylindrical inner surface, duct means being formed in said detecting member to conduct fluid under pressure separately to each of said recesses.

6. In combination with a body mounted on a rotary shaft for rotation about the axis thereof and a balancer member coaxial with said shaft, and containing a plurality of balancing elements displaceable in said member and dividing it into arcuate chambers, a mechanical bearing structure axially spaced from said balancer member and supporting the rotary shaft, a detecting member positioned between said balancer member and said bearing structure and including means for detecting any unbalance in said body comprising a cylindrical inner surface surrounding a length portion of said shaft with a clearance space therebetween, two axially spaced annular chambers in said detecting member, a first annular channel extending radially and circumferentially between said clearance space and one of said two annular chambers, a second annular channel extending radially and circumferentially between said clearance space and the other annular chamber, a plurality of ducts in said shaft for establishing separate communications between said clearance space and each of said arcuate chambers, said ducts opening into said clearance space at equi-angularly spaced points lying between said first channel and said second channel, and means for conducting fluid under pressure to said two annular chambers to produce pressure differentials in said clearance space about the axis of said shaft, proportional to any unbalance of said body to induce a compensating shift in the relative position of said balancing elements in accordance with said pressure differentials.

References Cited by the Examiner

UNITED STATES PATENTS

| 2,683,636 | 7/1954 | Wilcox | 308—9 |
| 2,756,114 | 7/1956 | Brunzel. | |
| 2,778,243 | 1/1957 | Darrieus | 74—573 |
| 2,877,066 | 3/1959 | Baumeister. | |

FOREIGN PATENTS

| 1,088,917 | 9/1954 | France. |

DON A. WAITE, *Primary Examiner.*

FRANK SUSKO, ROBERT C. RIORDON, *Examiners.*